United States Patent [19]

Blytas et al.

[11] 4,164,507

[45] Aug. 14, 1979

[54] PROCESS FOR SEPARATION OF SALT FROM HEAVY ENDS WASTES OF GLYCERINE MANUFACTURE

[75] Inventors: George C. Blytas; Carl H. Deal, both of Houston, Tex.

[73] Assignee: Shell Oil Company, Houston, Tex.

[21] Appl. No.: 924,412

[22] Filed: Jul. 13, 1978

[51] Int. Cl.² .............................................. C02B 1/20
[52] U.S. Cl. .................... 260/412.5; 210/21; 210/54; 210/56; 210/45; 260/412.8; 260/428.5; 203/14; 203/63
[58] Field of Search ...................... 210/21, 22 R, 54 R, 210/45, 42 R, 56, 71, 72, 59, 60; 203/14, 20, 63; 260/412.5, 412.8, 428.5

[56] References Cited

U.S. PATENT DOCUMENTS

| | | | |
|---|---|---|---|
| 2,601,375 | 6/1952 | Durkee | 260/412.5 |
| 3,751,442 | 8/1973 | Rancurel | 260/412.8 |
| 3,826,720 | 7/1974 | Lowrey | 203/14 |

*Primary Examiner*—Benoit Castel

[57] ABSTRACT

A process is described for separating salt (sodium chloride) from the polyglyceride-containing organic phase of the heavy ends waste or glycerine foots still bottoms obtained in conventional manufacture of glycerine via hydrolysis of epichlorohydrin or glycerol dichlorohydrins. In this process, the heavy ends wastes made up primarily of salt and polyclycerides and containing less than about 6% by weight water are treated at elevated temperatures with sufficient amounts of n-butanol to bring about precipitation of the salt followed by separation of the n-butanol-containing liquid phase substantially free of salt from the precipitated salt, cooling of the separated liquid phase to a temperature at which the n-butanol phase separates from the substantially salt-free polyglyceride phase without further salt precipitation and recovery of the n-butanol from the phase-separated polyglyceride phase. After recovery from the phase separated, substantially salt free polyglyceride phase, the n-butanol is suitably recycled to the first step of the process for use in precipitating additional quantities of salt from the heavy ends wastes.

7 Claims, 1 Drawing Figure

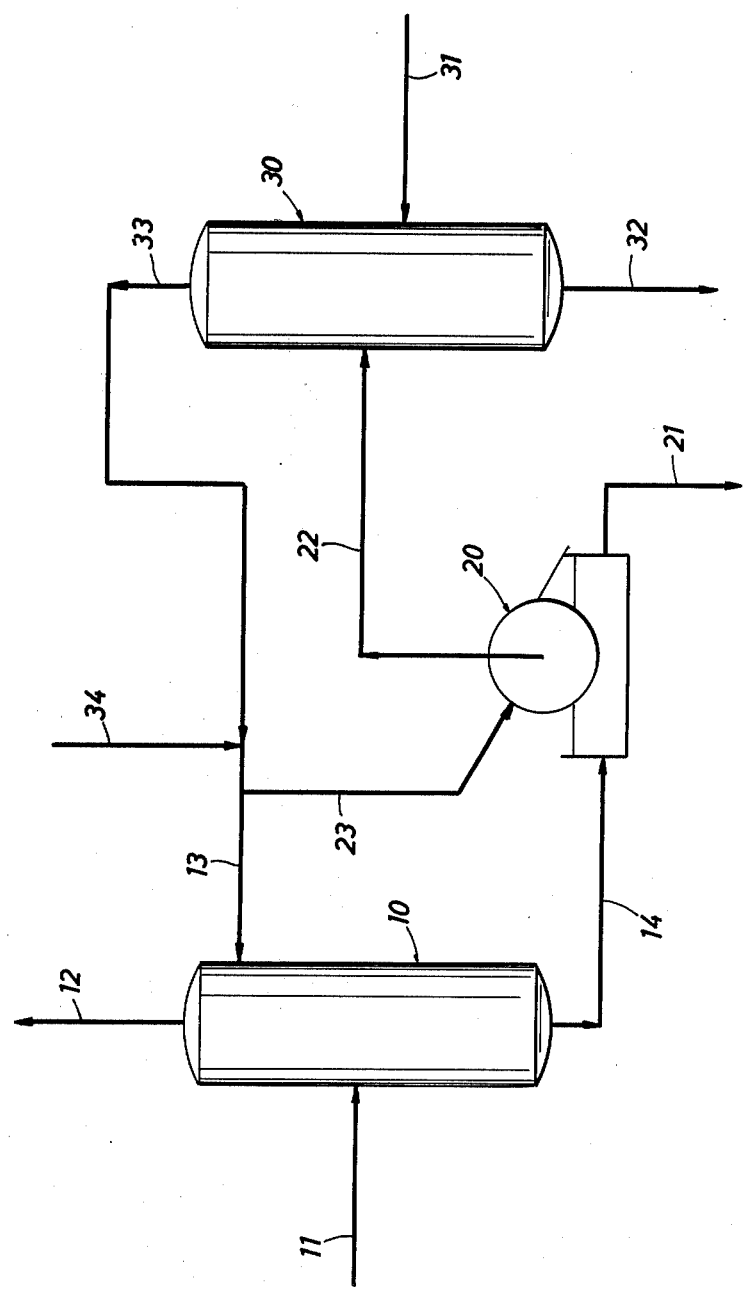

PROCESS FOR SEPARATION OF SALT FROM HEAVY ENDS WASTES OF GLYCERINE MANUFACTURE

BACKGROUND OF THE INVENTION

This invention relates to a method of separating salt from polyglyceride-containing heavy ends obtained, for example, in conventional manufacture of glycerine via hydrolysis of epichlorohydrin or glycerol dichlorohydrins. More particularly, this invention is directed to a solvent-aided crystallization process for separation of salt from glycerine foots still bottoms, a heavy ends waste stream, obtained in glycerine manufacture, containing salt and polyglycerides as principal components along with a minor amount of water.

The conventional process for manufacture of synthetic glycerine by hydrolysis of epichlorohydrin or glycerol dichlorohydrins affords a crude reaction product which contains significant amounts of salt (sodium chloride) and polyglycerides (polyglycols) in addition to glycerine and water. In this process, salt is typically obtained as a primary reaction product since sodium hydroxide and/or a basic sodium salt e.g. sodium carbonate, is usually employed to promote the hydrolysis reactions. The polyglycerides, in turn, are obtained from a variety of sources—e.g., polymerization of reactant epichlorohydrin, glycidol intermediate and/or side reactions involving glycerine—which combine to make these polyglycerides or polyglycols the most significant by-product formed in the process. While conventional techniques for purification and recovery of this crude glycerine include a series of concentration i.e. distillation, steps wherein salt is removed from the glycerine product via precipitation and solids separation, including water washing, it is not possible on a practical scale to completely eliminate the salt from the glycerine product by these concentration techniques alone. As a result, complete product recovery in the typical purification scheme invariably involves a high temperature distillation step wherein at least a portion of the glycerine product is distilled overhead from a salt and heavy ends i.e. polyglyceride, bottoms product. This bottoms product, known conventionally as the glycerine foots bottoms or foots still bottoms typically contains from about 50 to 65% by weight salt, from about 50 to about 35% by weight polyglycerides, in addition to small amounts of unrecovered glycerine and other organic impurities. In the past, much of this glycerine foots still bottoms was disposed of by passing it directly to conventional biotreatment facilities since it was considered impractical to further isolate and/or recover the various components in view of their low value and the corresponding problems and expense attendant to separation of such a complex and difficult to separate mixture. However, the glycerine foots still bottoms are not readily biodegradable and as a result they contribute disproportionately to the biotreater load. Further, alternative direct disposal methods such as incineration are not acceptable because the high proportion of inorganic matter (salt) in the foots still bottoms would likely give rise to excessive particulate formation in the incineration off-gases in the absence of expensive scrubbing facilities.

From the foregoing it is apparent that considerable advantage would be obtained if an economic and effective technique could be developed for substantially complete separation of the glycerine foots still bottoms into its major components, i.e., separation of salt from the organic polyglyceride phase. Such a separation would then allow each of the components to be disposed of in the simplest and most environmentally acceptable way i.e., incineration of the organic polyglyceride phase and biotreatment of the salt, without encountering problems attendant to the use of similar means for direct disposal of the mixed waste stream.

SUMMARY OF THE INVENTION

A solvent aided crystallization process has now been found which affords substantially complete separation of salt from the polyglyceride phase of a glycerine foots still bottoms waste stream containing less than about 6% by weight water. In the initial step of this process, substantially all of the salt present in the still bottoms is precipitated by the addition of a sufficient amount of n-butanol solvent at an elevated temperature at which n-butanol and the still bottoms are miscible. Subsequently, the precipitated salt is separated by a suitable liquid-solids separation technique e.g., filtration or centrifugation, to afford a n-butanol containing polyglyceride phase which is substantially free of salt. After removal of the salt, the n-butanol is recovered by cooling the substantially salt-free polyglyceride phase to a temperature at which the n-butanol phase separates from the polyglyceride phase without further salt precipitation. The use of n-butanol to precipitate salt from the still bottoms having the aforementioned low water-content is advantageous in that n-butanol exhibits high miscibility with the polyglyceride phase of the still bottoms at moderately elevated temperatures e.g. above about 90° C., while becoming essentially immiscible at lower temperatures e.g. below about 65° C. This large effect of temperature on miscibility allows the n-butanol solvent to be recovered essentially free of polyglyceride and salt simply by cooling in contrast to other possible alkanol solvents such as n-propanol which would require less economic and more energy intensive recovery techniques such as evaporation. Thus, the process of the present invention provides for a relatively simple and cost effective cyclic operation since the n-butanol solvent recovered from the substantially salt-free polyglyceride phase can be recycled to the first or salt precipitation step of the process with minimal operating expense and loss of solvent.

Other advantages accrue from the essentially complete separation of still bottoms components which is obtained with the process of the invention. If the water content of the still bottoms treated is maintained at less than about 6% by weight, it is possible to reduce the salt content of the separated polyglyceride phase to a very low level, e.g. less than about 1% by weight. By reducing the salt concentration to this low level, the polyglyceride phase can be readily disposed of by incineration as an alternative to biotreatment without the risk of excessive particulate formation in the incineration off-gases. Further, if desired, the organic or polyglyceride content of the precipitated salt is also reduced to a level e.g., 1% by weight, by appropriate additional solvent wash, such that the salt can be suitably passed with dilution water to a conventional biotreatment facility without causing undue loads on the biotreater.

Accordingly, the instant invention broadly provides a process for separating salt (sodium chloride) from a glycerine foots still bottoms made up principally of salt and an organic polyglyceride phase containing less than about 6% by weight water which comprises:

(a) mixing the still bottoms with n-butanol at a n-butanol:still bottoms weight ratio of from about 0.8:1 to about 3.0:1, preferably about 1.3:1 to 2:1, at a temperature in the range of 90° to 120° C., preferably 95° to 105° C., thereby precipitating substantially all of the salt present in the still bottoms;

(b) separating the precipitated salt from the still bottoms to afford a substantially salt-free polyglyceride phase containing the n-butanol and a solid salt phase substantially free of polyglycerides;

(c) cooling the substantially salt-free polyglyceride phase to a temperature below about 65° C. thereby phase separating the n-butanol from the polyglyceride phase without further precipitation of salt;

(d) separating the phase separated n-butanol obtained in step (c) and recycling said separated n-butanol to step (a) to effect further salt precipitation from the still bottoms.

THE DRAWING

The invention will be described in greater detail with reference to the attached FIGURE which depicts a schematic flow diagram of a preferred embodiment according to the invention.

DESCRIPTION OF THE PREFERRED EMBODIMENTS

The process of the invention is particularly applicable to the separation of salt (sodium chloride) from the salt-containing heavy ends waste stream obtained in conventional manufacture of glycerine by the hydrolysis of epichlorohydrin or glycerol dichlorohydrins. This heavy ends waste stream, known conventionally as the glycerine foots still bottoms, is typically obtained as the bottoms product of a high temperature distillation e.g., steam distillation at 140° to 160° C., in the glycerine recovery and purification section of the process wherein glycerine is recovered as an overhead product from the glycerine-containing bottoms product which carries through the glycerine concentration steps of the process. Typically, the glycerine foots still bottoms is a viscous or tar like mixture melting at about 65° C. which contains about 40 to 60% by weight salt, present in both dissolved and suspended forms, with the remainder being substantially an organic phase made up of polyglycerides formed as by-products of the manufacturing process (di- and polyglycols). The still bottoms also usually contain water and unrecovered glycerine e.g. 1 to 10% by weight glycerine. The water present in the bottoms product results from the practice of injecting live steam into the bottoms to reduce the viscosity of the salt/glyceride mixture which can typically result in from about 10 to about 40%w water being present in the still bottoms. Since water tends to interfere with the miscibility of the n-butanol and the polyglyceride phase as well as increase the amount of salt carried over into the polyglyceride phase after salt precipitation in the first step of the process of the invention, it is advantageous to maintain the water content of the glycerine foots still bottoms treated with the process of the invention at a level of less than about 6% by weight water. Thus, it may be preferred to add not more than 6%w water by steam injection to reduce the viscosity of the still bottoms which are treated in accordance with this invention. In those cases where the water content exceeds the 6% by weight value, the glycerine foots still bottoms can be suitably subject to a partial dehydration step prior to use in the process of the invention. This dehydration can be carried out using any conventional technique such as distillation at atmospheric or reduced pressures. In cases where the dehydration is effected by distillation, the glycerine foots still bottoms are suitably passed to an evaporator operated at 130°–150° C. and 0.5–1 atm prior to being mixed with n-butanol in accordance with the invention. For optimum operation using n-butanol, it is preferable to maintain the water content of the glycerine foots still bottoms at a level of less than about 6% by weight. In yet another variant of the process, it is possible to add n-butanol directly into the bottoms with or without some steam addition, thus avoiding the need for a separate dehydration step.

In the first step of the process of the invention, n-butanol is mixed with the glycerine foots still bottoms in a sufficient quantity to precipitate substantially all of the salt present at a temperature which is high enough to insure substantially complete miscibility of the n-butanol and polyglyceride phase without the need of high pressure operation to avoid solvent boil off. At water concentrations approaching 6% by weight of the glycerine foots still bottoms, temperatures as high as 110° C. may be required to insure miscibility; however, more typically the temperature range employed for this mixing step is between about 95° and about 105° C. The amount of n-butanol required to precipitate the salt will vary somewhat depending on the amounts of salt and water present and the specific nature of the polyglycerides present in the organic phase. In most cases, substantially complete precipitation of the salt present can be obtained if n-butanol is added to the glycerine foots still bottoms at an n-butanol:still bottoms weight ratio of about 0.8:1 to about 3:1 with ratios in the range of 1.3:1 to 2:1 being preferred. While the use of n-butanol:still bottoms weight ratios in excess of 3:1 are not precluded in theory, practical considerations such as equipment sizing and solvent inventory tend to limit the use of such high n-butanol:still bottoms weight ratios. It will be appreciated that the amount of salt precipitated in this first step of the process of the invention is primarily dependent on the amount of n-butanol which is added to the still bottoms up to a maximum which, in turn, is dependent on the inherent solubility of salt in n-butanol. Using the n-butanol:still bottoms mixing ratios given above, up to 99% by weight of the salt present can be precipitated from the typical glycerine foots still bottoms. In any particular case, a minor amount of experimentation can be employed to determine the optimum ratio of n-butanol:still bottoms required for maximum salt precipitation.

The first step of the process of the invention is suitably carried out using any conventional mixing technique whereby the n-butanol and still bottoms can be placed in intimate contact at elevated temperature for a sufficient time to precipitate the salt. Since the salt precipitation occurs almost instantaneously after the n-butanol and still bottoms are completely mixed, both batch and continuous mixing techniques, can be used, with continuous techniques being preferred for plant scale operations. In this regard, the mixing step can be suitably carried out in pipeline or static mixers or in an agitated vessel in which n-butanol and still bottoms are continuously added as separate streams at some point above the vessel bottom and a mixture of precipitated salt, foots still bottoms and n-butanol withdrawn as a slurry bottoms product from the vessel. Since the still bottoms passed to the first step of the process will typically be at a high temperature e.g., 140°–150° C. as a result of previous processing, the temperature of the mixing step can be suitably controlled by adjusting the temperature of the n-butanol added. In a preferred embodiment of the invention, discussed in further detail below, the n-butanol solvent is mixed with the still bottoms by adding the n-butanol to an agitated evaporator employed to partially dehydrate the glycerine foots still bottoms to a constant water content of less than about 6% by weight. In this preferred embodiment, water is distilled overhead under temperature and pressure conditions selected so as to reduce the water to less than 6%w, e.g. at 130°–140° C. and 0.3 to 1.0 atm, and at a temperature such that addition of n-butanol at 60°–65° C. results in an end temperature of 90°–100° C. thereby effecting substantially complete precipitation of the salt directly in the agitated evaporator. This precipitated salt is then removed as a slurry from the bottom of the evaporator in admixture with the n-butanol and substantially salt-free still bottoms.

After being mixed with n-butanol, the glycerine foots still bottoms containing the precipitated salt is passed in slurry form to a liquid-solids separation zone wherein the salt is separated as a solid precipitate to afford a substantially salt-free polyglyceride phase containing n-butanol. This liquid-solids separation is desirably effected before the slurry is allowed to cool significantly since a portion of the polyglyceride phase may tend to form tar-like solids and interfere with the salt separation once miscibility with the liquid n-butanol is lost. In this regard, it is preferred to carry out the liquid-solids separation step at a temperature of from about 50° to about 65° C. Suitable liquid-solids separation procedures for this step of the process of the invention include conventional techniques such as gravity separation, centrifugation and filtration. Preferably, this salt precipitate separation is effected by filtration under $N_2$ pressure since this technique can be carried out rather quickly on a large scale thereby avoiding the possibility of suspended polyglycerides settling out on the top of the salt phase. Operation of the liquid-solids separation in the above manner will generally afford a separated salt phase which contains less than about 10% by weight organic polyglycerides. The organic content of this solid salt phase is such that it can be disposed of directly in conventional biotreatment facilities without causing an undue load on the biotreater. If desired, the polyglyceride content of the separated salt can be reduced to less than 1%w by washing with n-butanol or a lower alkanol solvent such as methanol or ethanol.

Upon removal of the solid salt precipitate, the polyglyceride phase containing the n-butanol solvent is cooled to a temperature at which the n-butanol becomes substantially immiscible with the polyglyceride phase and the n-butanol is phase separated for recycle to the first step of the process of the invention. At this point, the polyglyceride phase is sufficiently free of salt i.e., salt contents typically being less than 1% by weight based on the weight of the polyglyceride phase, that the mixture can be cooled and n-butanol separated off without encountering further salt precipitation. In this phase of the process, substantially complete separation of the n-butanol from the desalted still bottoms can be obtained by cooling the mixture under quiescent conditions to less than 65° C., preferably to a temperature between about 55° and about 60° C. Procedurally, this separation is suitably effected by passing the n-butanol/still bottoms mixture into indirect heat exchange with an external source of coolant and then on to a phase separation vessel of appropriate size to afford sufficient residence time for complete phase separation i.e. 20 minutes to several hours. Alternatively, the mixture can be passed directly to one or more phase separation vessels and allowed to cool and phase separate without the use of an external coolant source. If desired, after salt separation, a minor amount of water can be added to the phase separator to reduce the viscosity of the polyglyceride phase, for example 20% to 50% part by weight water per part of polyglyceride phase. In cases where polyglycerides are disposed by incineration, the water of dilution should be kept at a low enough level to allow self-sustained incineration. After phase separation, the polyglyceride phase, substantially free of salt, can be passed directly to incineration or wet oxidation without encountering problems due to salt contamination. The separated n-butanol recovered as the top phase in the phase separator typically contains only a minor amount of polyglycerides i.e., less than 10% by weight, and is quite suitable for reuse in the process of the invention. Accordingly, this recovered n-butanol is suitably recycled to the first step of the process where it makes up the bulk of the n-butanol charge for precipitation of salt from fresh glycerine foots still bottoms. To compensate for minor n-butanol losses through the process, a small amount of make up n-butanol is added along with the recycle n-butanol to maintain the proper n-butanol:still bottoms ratio in the first step of the process. Thus makeup n-butanol typically amounts to no more than about 3% of the total n-butanol charge to the first step of the process. In addition to reducing the viscosity of polyglyceride solution, water minimizes the amount of butanol lost through solubility in the glyceride phase.

Reference will now be made to the attached FIGURE which represents a schematic flow diagram of a preferred embodiment of the present invention wherein salt is separated from a glycerine foots still bottoms initially containing more than 6% by weight water. It is to be understood that the FIGURE is only a schematic representation of the process and does not purport to show the conventional instrumentation and valving present in a typical process.

A typical glycerine foots still bottoms feed containing from about 10 to 40% weight water as a result of steam injection in the glycerine foots still (not shown) is introduced via line 11 into an agitated evaporator/mixer, 10 at a temperature of about 120°–140° C. and pressure of about 1 atm. In this evaporator/mixer, water is distilled overhead via line 12 to afford a still bottoms heel containing less than about 6% by weight water which is simultaneously mixed with n-butanol added by line 13 at a n-butanol:still bottoms weight ratio of 1.5:1 to effect substantially complete precipitation of the salt present in the still bottoms. The n-butanol added via line 13 to the evaporator/mixer is made up substantially of n-butanol recycled from the process along with a minor amount of fresh or make up n-butanol, the sources of which will be discussed in further detail below.

After allowing for a residence time sufficient for complete mixing of the still bottoms and n-butanol and precipitation of the salt e.g., 10 minutes to 2 hours the time depending on the conditions of crystallization, the mixture of still bottoms and n-butanol containing the precipitated salt are removed in slurry form from the bottom of the evaporator mixer via line 14. This slurry is then passed without cooling by line 14 to a drum filter 20 wherein the precipitated salt is removed as a solid filter cake via line 21 to afford a mixture of n-butanol and organic polyglycerides which is substantially free of salt. If desired, a small stream of 95° C. n-butanol can be split off the n-butanol charge to the evaporator/mixer and passed via line 23 to the drum filter for washing of residual organic matter out of the salt filter cake. In this manner, the organic (polyglyceride) content of the salt sent to disposal or other processing by line 21 can be reduced to less than 1% by weight. This stream of n-butanol can be recycled to the butanol/glyceride phase separation step for recovery of n-butanol at 65° C.

The mixture of organic polyglyceride phase and n-butanol which is separated from the precipitated salt in the drum filter is passed via line 22 to a phase separator 30 where it is cooled to 60° C. and allowed to phase separate without further salt precipitation under quiescent conditions (20 minutes to several hours residence time). If desired, a minor amount of water can be added via line 31 to this phase separator to reduce the viscosity of the polyglyceride phase as it separates, and to phase out n-butanol. The polyglyceride phase which collects in the bottom of the phase separator contains less than 1% by weight salt and is passed via line 32 to disposal or further processing. Similarly, the n-butanol solvent is recovered as the top phase in the phase separator and passed via lines 33 and 13 back to the evaporator/mixer 10. To make up for minor n-butanol losses which occur through the process, a small amount of fresh or make up n-butanol is added via line 34 into the n-butanol recycle in line 13 to maintain a constant n-butanol:still bottoms ratio in the evaporator/mixer. This make up n-butanol typically amounts to no more than 3% of the total n-butanol feed to the evaporator/mixer.

Illustrative Embodiment I

To demonstrate the miscibility of n-butanol with the organic polyglyceride phase of glycerine foots still bottoms obtained in conventional manufacture of glycerine via hydrolysis of epichlorohydrin, n-butanol was mixed with a typical commercial plant-produced glycerine foots still bottoms containing varying amounts of water and the temperature of the mixture was slowly increased until complete miscibility of the liquid phases was observed. The results of the tests along with the amounts of water present and n-butanol:still bottoms weight ratios employed are given below in Table 1.

TABLE 1

| %H$_2$O in Still Bottoms | Weight Ratio n-butanol: Still Bottoms | Miscible at ° C. |
|---|---|---|
| 19 | 2 | 127 |
| 8 | 2 | 118 |
| 6 | 1.3 | 116 |
| 5 | 1.3 | 96 |

TABLE 1-continued

| %H$_2$O in Still Bottoms | Weight Ratio n-butanol: Still Bottoms | Miscible at ° C. |
|---|---|---|
| 3 | 2 | 70 |

Illustrative Embodiment II

The efficacy of the process of the invention was established by treating a typical sample of partially dehydrated glycerine foots still bottoms containing about 3% by weight water with n-butanol at varying n-butanol:still bottoms weight ratios at 95° C. followed by separation of the precipitated salt and cooling of the resultant n-butanol/still bottoms mixture to 60°-65° C. to phase separate the mixed phases. The approximate analysis of the foots still bottoms employed was as follows (water-free basis):

| Component | %w |
|---|---|
| NaCl | 45–55 |
| Diglycerol and Other Compounds with mol. wt 200 ± 100 | 40–45 |
| Polymeric Compounds with mol. wt 10,000 Strong UV Absorbers | 5% |

The experiments were carried out by mixing n-butanol with the still bottoms at n-butanol:still bottoms weight ratios of 1.3–2:1 at 95° C. for 30 minutes followed by removal of the precipitated salt by filtration and cooling of the supernate phase to 60° to 65° C. for 60 minutes in a phase separation vessel. The results of the tests including the amount of salt rejected by precipitation and the distribution of residual salt in the separated supernate phases is given below in Table 2.

TABLE 2

| N-Butanol Still Bottoms Weight Ratio | % W Salt in Supernatant Phase | % Salt Rejection by Precipitation | Distribution of Salt and Water In the Separated N-Butanol and Still Bottoms Phase at 600° C. | | | |
|---|---|---|---|---|---|---|
| | | | Stills Bottoms | | N-Butanol | |
| | | | NaCl %w | H$_2$O %w | NaCl %w | H$_2$O |
| 1.3 | 0.64 | 98.7 | 0.64 | 1.25 | 0.08 | 0.32 |
| 2 | 0.59 | 98.9 | 0.59 | 1.6 | 0.07 | 0.16 |
| 1.3 | 0.64 | 98.7 | 0.64 | 1.13 | 0.15 | 0.23 |
| 2 | 0.65 | 98.7 | 0.65 | 0.63 | 0.13 | 0.15 |

What is claimed is:

1. A process for separating sodium chloride salt from a glycerine foots still bottoms made up principally of salt and an organic polyglyceride phase containing less than about 6% by weight water which comprises:
   (a) mixing the still bottoms with n-butanol in a n-butanol:still bottoms weight ratio of from about 0.8:1 to about 3:1 at a temperature in the range of 90° to 120° C. thereby precipitating substantially all of the salt present in the still bottoms;
   (b) separating the precipitated salt from the still bottoms to afford a substantially salt-free polyglyceride phase containing the n-butanol and a solid salt phase substantially free of polyglycerides;
   (c) cooling the substantially salt-free polyglyceride phase to a temperature below about 65° C. thereby phase separating the n-butanol from the polyglyceride phase without further precipitation of salt;

(d) separating the phase separated n-butanol obtained in step (c) and recycling said separated n-butanol to step (a) to effect further salt precipitation from the still bottoms.

2. The process according to claim 1 wherein the precipitated salt is separated in step (b) by filtration.

3. The process according to claim 2, wherein a minor amount of the n-butanol recovered in step (d) is used to wash residual organic matter out of the salt filter cake separated in step (b).

4. The process according to claim 1 wherein a small amount of water is added to the phase separated polyglyceride phase in step (c) to reduce its viscosity and to reduce the residual amount of n-butanol therein.

5. The process according to claim 1 wherein the glycerine foots still bottoms starting material is derived by partially dehydrating a glycerine foots still bottoms containing up to 40% by weight by water coming off the bottom of the foots still.

6. The process according to claim 5 wherein the partial dehydration is carried out by distillation in an agitated vessel.

7. The process according to claim 6 wherein the n-butanol still bottoms mixing step (a) is carried out by adding the n-butanol directly into the polyglyceride liquid in the bottom of the agitated vessel employed for partial dehydration.

* * * * *